(12) United States Patent
Terrell, II

(10) Patent No.: US 8,321,872 B2
(45) Date of Patent: Nov. 27, 2012

(54) REUSABLE, OPERATING SYSTEM AWARE HARDWARE MUTEX

(75) Inventor: James R. Terrell, II, Charlotte, NC (US)

(73) Assignee: Nvidia Corporation, Santa Clara, CA (US)

( * ) Notice: Subject to any disclaimer, the term of this patent is extended or adjusted under 35 U.S.C. 154(b) by 1531 days.

(21) Appl. No.: 11/461,755

(22) Filed: Aug. 1, 2006

(65) Prior Publication Data

US 2008/0005741 A1 Jan. 3, 2008

Related U.S. Application Data

(63) Continuation-in-part of application No. 11/427,015, filed on Jun. 28, 2006.

(51) Int. Cl.
G06F 9/50 (2006.01)
G06F 12/00 (2006.01)
G06F 13/00 (2006.01)

(52) U.S. Cl. ........ 718/104; 718/100; 718/102; 710/200; 710/220; 710/240; 710/241; 710/242; 710/243; 710/244; 711/150; 711/151; 711/152

(58) Field of Classification Search .................. None
See application file for complete search history.

(56) References Cited

U.S. PATENT DOCUMENTS

| 5,678,026 | A | * | 10/1997 | Vartti et al. ................ 711/152 |
| 5,956,712 | A | * | 9/1999 | Bennett et al. ................ 1/1 |
| 6,105,049 | A | | 8/2000 | Govindaraju et al. |
| 6,230,230 | B1 | * | 5/2001 | Joy et al. ................ 710/200 |
| 6,496,909 | B1 | * | 12/2002 | Schimmel ................ 711/163 |
| 6,499,048 | B1 | * | 12/2002 | Williams ................ 718/102 |
| 7,120,762 | B2 | | 10/2006 | Rajwar et al. |
| 7,290,105 | B1 | * | 10/2007 | Jeter et al. ................ 711/163 |
| 7,340,743 | B1 | | 3/2008 | Anural et al. |
| 7,409,506 | B2 | * | 8/2008 | Kamigata et al. ........... 711/151 |
| 2002/0078123 | A1 | * | 6/2002 | Latour ................ 709/104 |
| 2003/0120903 | A1 | | 6/2003 | Roussel |
| 2004/0025069 | A1 | * | 2/2004 | Gary et al. ................ 713/300 |
| 2006/0117316 | A1 | * | 6/2006 | Cismas et al. ............... 718/103 |

* cited by examiner

*Primary Examiner* — Qing Wu

(57) ABSTRACT

Hardware resources sharing for a computer system running software tasks. A controller stores records including a mutex ID tag and a waiter flag in a cache. Lock and unlock registers are readable by the controller and loadable by the tasks with a mutex ID specifying a hardware resource. The controller monitors whether the lock register for loading with a mutex ID, and then determines whether it corresponds with the tag of a record in the cache. If so, it sets the record's waiter flag. If not, it adds a record having a tag corresponding with the mutex ID. The controller also monitors whether the unlock register for loading with a mutex ID, and then determines whether it corresponds with the tag of a record in the cache. If so, it determines whether that record's waiter flag is set and, if so, it clears that record from the cache.

20 Claims, 8 Drawing Sheets

REUSABLE, OPERATING SYSTEM AWARE HARDWARE MUTEX

CROSS-REFERENCE TO RELATED APPLICATIONS

This is a continuation-in-part of application Ser. No. 11/427,015, filed 28 Jun. 2006, hereby incorporated by reference in its entirety.

TECHNICAL FIELD

The present invention relates generally to input and output in electrical computers and digital data processing systems, and more particularly to means or steps for controlling access to shared resources in such systems.

BACKGROUND ART

FIG. 1 (background art) is a block diagram depicting how a modern computerized system can be a complex environment. Generally, one or more software processes are present and employ one or more hardware resources. The software processes can be executing on a single or on multiple processors, and can potentially have multiple threads of execution. For simplicity, each portion of a software process or processes of concern herein is simply termed a "software task."

In modern a computer operating system (OS) mutex primitives are widely used to protect shared resources from overlapping multi-threaded software access. This is desirable because in most critical-section applications, one or more tasks need to share a resource (e.g., a common data area, a hardware resource, or some other single-access resource). Typically, actual contention for the shared resource is relatively rare, and this mutex protection mechanism is only needed to handle infrequent occasions when more than one task attempts to change a resource at the same time.

Given that the actual resource contention is rare, the processing time required to lock and unlock mutexes is largely wasted effort. The lock and unlock operations often must invoke the kernel of the OS, which can be fairly burdensome in terms of the computing time expended. This is especially the case in a real-time operating system (RTOS). As mutex operations become more burdensome, the critical software sections must be made more coarse-grained, since it becomes less and less economical to lock and unlock the resource in a fine-grained manner due to the overhead this would add.

Furthermore, the management of traditional mutexes by software often requires that processor interrupts be globally disabled while checking and maintaining the states of mutex variables stored in system memory. This is desirably avoided because disabling the interrupts, especially in a RTOS, adds potential latency to the interrupt response.

Another consideration when using software mutexes is priority inversion. A priority inversion occurs when a lower priority task has locked a mutex, and is then blocked for some reason. When a higher priority task then attempts to lock the mutex it is blocked until the lower priority task unlocks the mutex. In the meantime, tasks of intermediate priority may execute, causing the high priority task to wait for an indeterminate amount of time. This is termed "priority inversion" because tasks of intermediate priority are allowed to take precedence over the high priority task indefinitely.

A common solution to the priority inversion problem is to use an OS mutex lock code to temporarily boost the priority of the task which is holding the mutex lock to the same priority as the task which is waiting to acquire the lock. But this adds yet more complexity in implementation and overhead in operation.

Accordingly, what is needed is a mechanism that eliminates or significantly reduces the lock and unlock overhead under non-contending conditions in the kernel of an OS, and that streamlines the response whenever contention does occur. Preferably, such a mechanism should also eliminate the need to disable processor interrupts to check and manage mutexes. And preferably such a mechanism should reduce the burdens of handling priority inversion.

DISCLOSURE OF INVENTION

Accordingly, it is an object of the present invention to provide a hardware assisted or based mutex.

Briefly, one preferred embodiment of the present invention is a system for sharing a plurality of hardware resources in a computer system able to run a plurality of software tasks. A mutexes controller is provided with a locked mutex cache to store a list of records each including a mutex ID tag and a waiter flag. A lock register and an unlock register are each readable by the mutexes controller and loadable by the software tasks with a mutex ID specifying one of the hardware resources. The mutexes controller is further to monitor whether the lock register has been loaded with a mutex ID, and then determine whether that mutex ID corresponds with the mutex ID tag of a record present in the locked mutex cache. If so, it sets the waiter flag of the record. If not so, it adds a record to the locked mutex cache having a mutex ID tag that corresponds with the mutex ID. The mutexes controller is also further to monitor whether the unlock register has been loaded with a mutex ID, and then determine whether that mutex ID corresponds with the mutex ID tag of a record presently in the locked mutex cache. If so, it determines whether the waiter flag of that record is set and, if so, it clears that record from the locked mutex cache.

Briefly, another preferred embodiment of the present invention is a process for locking a mutex that controls access to a shared resource by software tasks running under an operating system. A lock register is monitored for a mutex ID having been loaded there in by one of the software tasks. Whether that mutex ID corresponds with a mutex ID tag of a record in a locked mutex cache is then determined. If so, a waiter flag of that record is set and a request is communicated to the operating system for conventional handling of the shared resource. Otherwise, if not so, a new record is added to the locked mutex cache with a mutex ID tag corresponding with the mutex ID, without interrupting the software tasks or the operating system.

And briefly, another preferred embodiment of the present invention is a process for unlocking a mutex that controls access to a shared resource by software tasks running under an operating system. An unlock register is monitored for a mutex ID having been loaded there in by one of the software tasks. Whether that mutex ID corresponds with a mutex ID tag of a record in a locked mutex cache is then determined. If the mutex ID does correspond with a record, it is determined whether a waiter flag of that record is set. If that waiter flag is set, an interrupt is asserted. Otherwise, if the waiter flag is not set, the record is cleared from the locked mutex cache. Alternately, however, if the mutex ID does not correspond with a record, an interrupt is asserted.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

Figure 1:
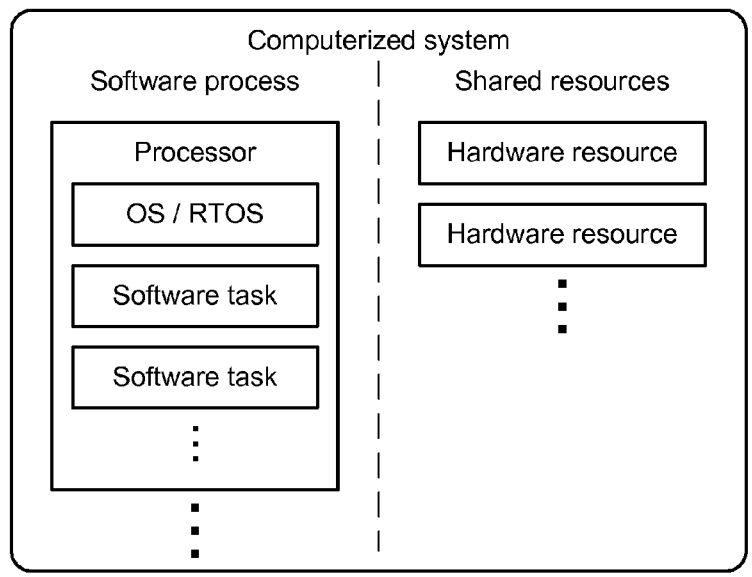
FIG. 1 (background art) is a block diagram depicting how a modern computerized system can be a complex environment.

Preferred embodiments of the present invention are hardware mutexes (HWMs). As illustrated in the various drawings herein, and particularly in the views of FIG. 2 and FIG. 5, preferred embodiments of the invention are depicted by the general reference characters 10 and 300.

Two implementations of an accelerated HWM are now described. The first is a "dedicated" HWM which uses a simpler hardware implementation but requires that hardware resources be dedicated for each critical software task that is being protected. The second is a "shared" HWM which uses a more complex implementation that can share a limited pool of mutex resources amongst many critical software tasks. Finally, the handling of some common mutex usages, such as priority inversion and nested mutexes, are discussed as they relate to the inventive accelerated HWMs.

In both implementations, the inventor prefers to take care to only accelerate non-contending mutex operations. While it is certainly possible to completely implement all facets of OS type mutex behavior in hardware, it is felt that the additional complexity brings only minor performance improvements while significantly increasing cost and stability.

The Dedicated Hardware Mutex (HWM)

Figure 2:
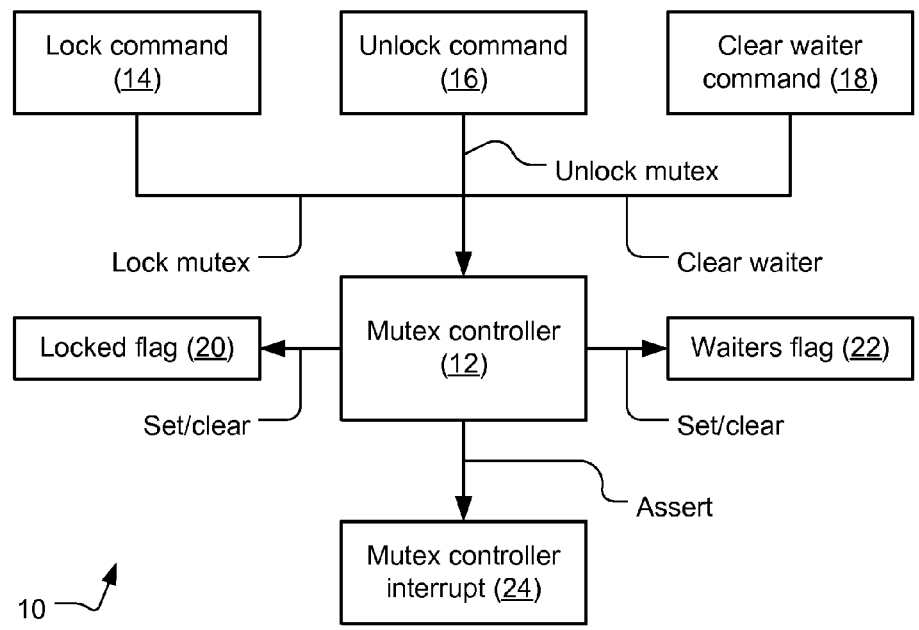
FIG. 2 is a block diagram showing the major components of a dedicated hardware mutex (dedicated HWM) in accord with the present invention.

FIG. 2 is a block diagram showing the major components of a dedicated HWM 10 in accord with the present invention. A mutex controller 12 for a shared hardware resource monitors a lock command register 14, an unlock command register 16, and a clear waiter command register 18 for indications from a software task. The mutex controller 12 then sets or clears a locked flag 20 and a waiters flag 22, as discussed below, and can assert a mutex controller interrupt 24.

Figure 3:
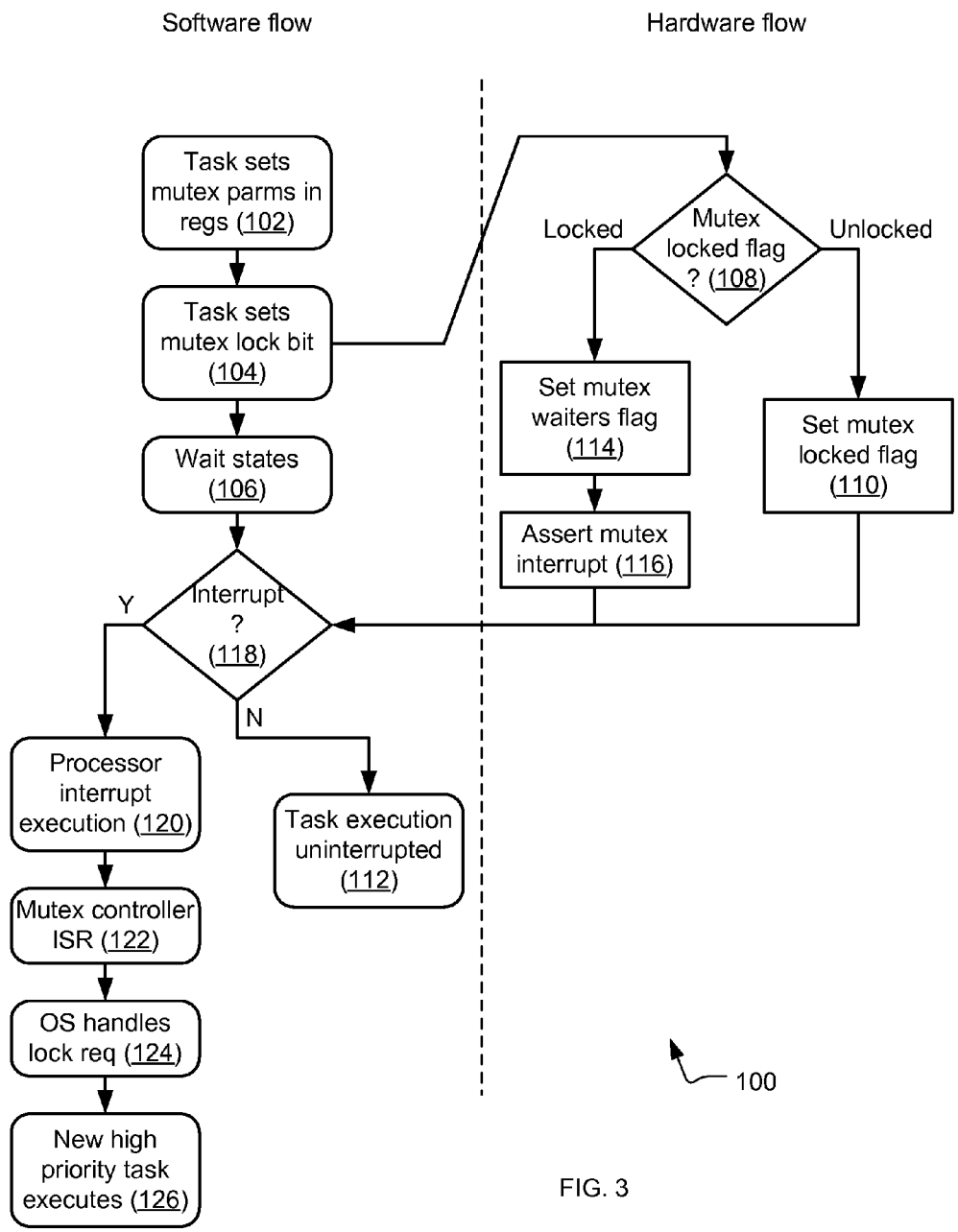
FIG. 3 is a flow chart showing a mutex lock process that is in accord with the present invention and suitable for use with the dedicated HWM.

FIG. 3 is a flow chart showing a mutex lock process 100 that is in accord with the present invention and suitable for use with the dedicated HWM 10. Software task related steps are shown on the left and the shared hardware resource related steps are shown on the right of this figure.

In an optional step 102 an executing software task first sets optional parameters into processor registers or other locations that are well-known to the OS. Some examples of such parameters are wait timeout values, and block versus non-blocking flags. In a step 104 the software task next sets a mutex lock bit in the lock command register 14, and in an optional step 106 wait states can be inserted to prevent the software task from executing instructions while the mutex controller 12 evaluates and acts on the lock request.

Separately, in a step 108 the mutex controller 12 monitors the lock command register 14 to determine the state of the dedicated HWM 10 (i.e., whether it has been requested to lock). If not, in a step 110 the mutex controller 12 sets the locked flag 20 (but does not assert the mutex controller interrupt 24). That is, it "silently" sets the flag and execution of the software task simply continues, with no interruption, at the instruction following the mutex lock process 100 (and any optional wait states) (i.e., at a step 112). Alternately, however, if it is determined in step 108 that the dedicated HWM 10 has already been locked, in a step 114 the mutex controller 12 sets the waiters flag 22 and in a step 116 asserts the mutex controller interrupt 24.

A step 118 here depicts where the software task becomes "aware" that it has been interrupted. Of course, if the mutex controller 12 has not asserted the mutex controller interrupt 24, the software task simply "sees" step 112 next.

If the mutex controller interrupt 24 was asserted, however, in a step 120 that causes execution of the software task to divert to the interrupt exception handler of its processor (the processor running that software task, if multiple processors are present). Here the interrupt exception handler saves the state of the processor, including the parameters left in registers by the calling software task (back in step 102). In a step 122 control then passes to an interrupt service routine (ISR) in the mutex controller 12, where the OS kernel is invoked using a semaphore or other OS primitive. In a step 124 the OS kernel then handles the rest of the request to lock the dedicated HWM 10 in software, referring to the saved parameters stored for the state of the processor to enable options such as dealing with lock timeouts, blocking versus non-blocking, and priority inversions. After handling the lock request in step 124, the OS scheduler locates the highest priority software task that is currently in a runnable state, and in a step 126 execution continues with that task.

Figure 4:
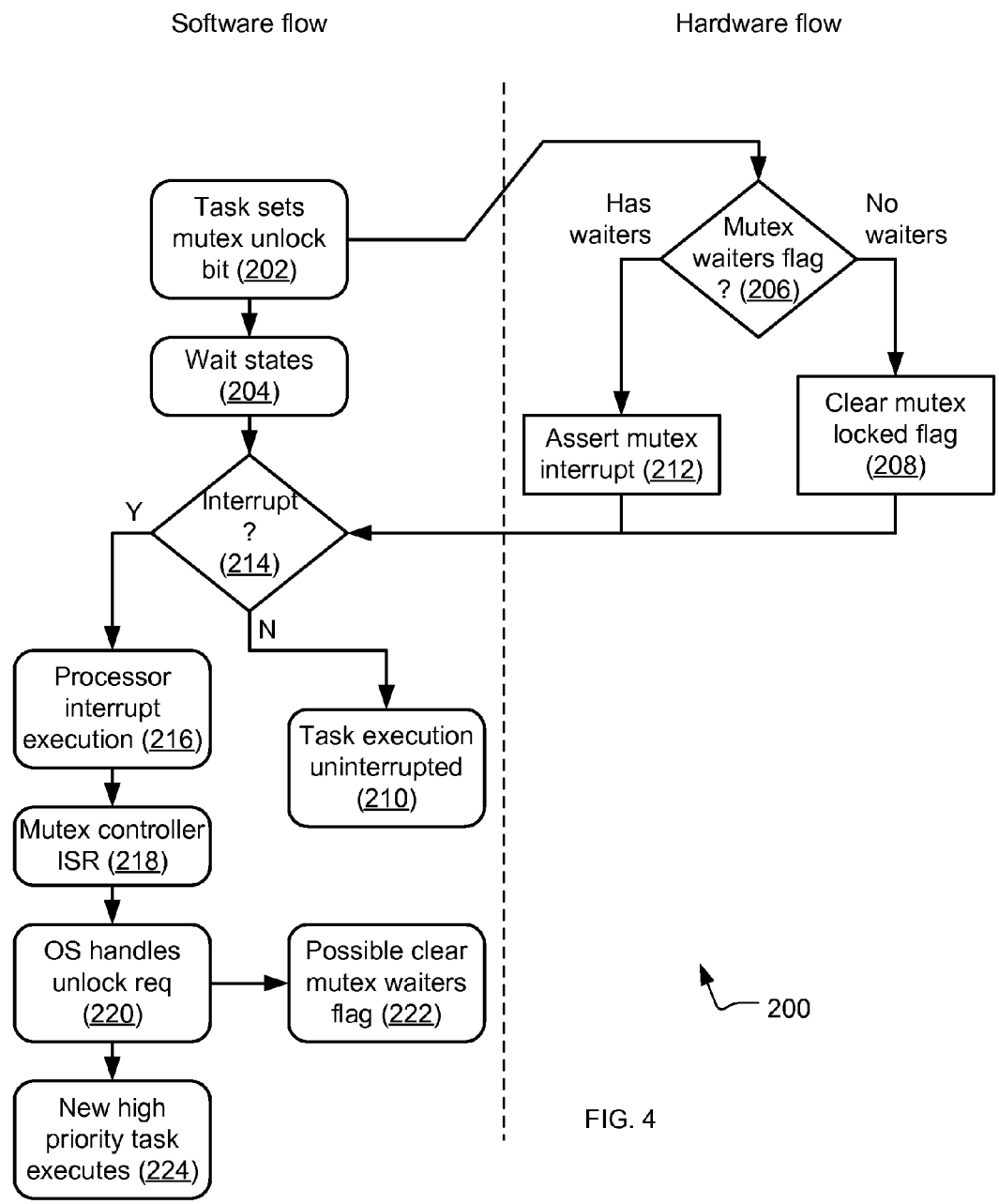
FIG. 4 is a flow chart showing a mutex unlock process that is in accord with the present invention and suitable for use with the dedicated HWM.

FIG. 4 is a flow chart showing a mutex unlock process 200 that is in accord with the present invention and suitable for use with the dedicated HWM 10. Again, software task related steps are shown on the left and the shared hardware resource related steps are shown on the right side of the figure.

In a step 202 an executing software task sets a mutex (un) lock bit in the unlock command register 16 and in an optional step 204 wait states can be inserted to prevent the software task from executing instructions while the mutex controller 12 evaluates and acts on the unlock request.

Separately, in a step 206 the mutex controller 12 monitors the state of the waiters flag 22 to determine if there are any software tasks waiting to lock the dedicated HWM 10. If the waiters flag 22 is not set, in a step 208 the mutex controller 12 clears the locked flag 20 (but does not assert the mutex controller interrupt 24). That is, it "silently" resets the flag and execution of the software task simply continues, with no interruption, at the instruction following the mutex unlock process 200 (and any optional wait states) (i.e., at a step 210). Alternately, however, if it is determined in step 206 that the waiters flag 22 is set, in a step 212 the mutex controller 12 asserts the mutex controller interrupt 24.

A step 214 here depicts where the software task becomes "aware" that it has been interrupted. Of course, here as well, if the mutex controller 12 has not asserted the mutex controller interrupt 24, the software task simply "sees" step 210 next.

If the mutex controller interrupt 24 was asserted, however, in a step 216 this causes execution of the software task to divert to the interrupt exception handler of its processor (the processor running that software task, if multiple are present). Here the interrupt exception handler saves the state of the processor. In a step 218 control then passes to an interrupt service routine (ISR) associated with the mutex controller 12 where the OS kernel is invoked using a semaphore or other OS primitive. In a step 220 the OS kernel then handles the rest of the request to unlock the dedicated HWM 10 in software. Optionally, if there are no other software tasks waiting to lock the dedicated HWM 10, in a step 222 the OS kernel can also clear the waiters flag 22, by setting a clear bit in the clear waiter command register 18 that the mutex controller 12 monitors for. After handling the unlock request in step 220, the OS scheduler locates the highest priority software task that is currently in a runnable state, and in a step 224 execution continues with that task.

The Shared Hardware Mutex (HWM)

When mutex accelerator capability is available, it is seemingly desirable to have as many mutexes as is possible, so that all shared resource protection can be accelerated. However, given that a complex system may have hundreds or even thousands of unique shared resources, providing an individual HWM for each shared resource can become burdensome. Also, since most mutexes protect against multiple access conditions to shared resources which rarely occur, dedicated hardware for this would be rarely used and could be mostly wasted.

If a given mutex is not locked by any software task, the only useful state that it carries is its unique identification, which is shared between all the software tasks that might lock it. Also, at any particular time, a typical computerized system will only have a few active critical software tasks that have locked mutexes. So, given that only locked mutexes are interesting and that there are very few of them at any particular time, it is the inventor's observation that a mutex cache can be created that tracks only locked mutexes. This approach then gives the appearance of an almost unlimited number of HWMs, yet requires only a small pool of hardware mutex structures.

Figure 5:
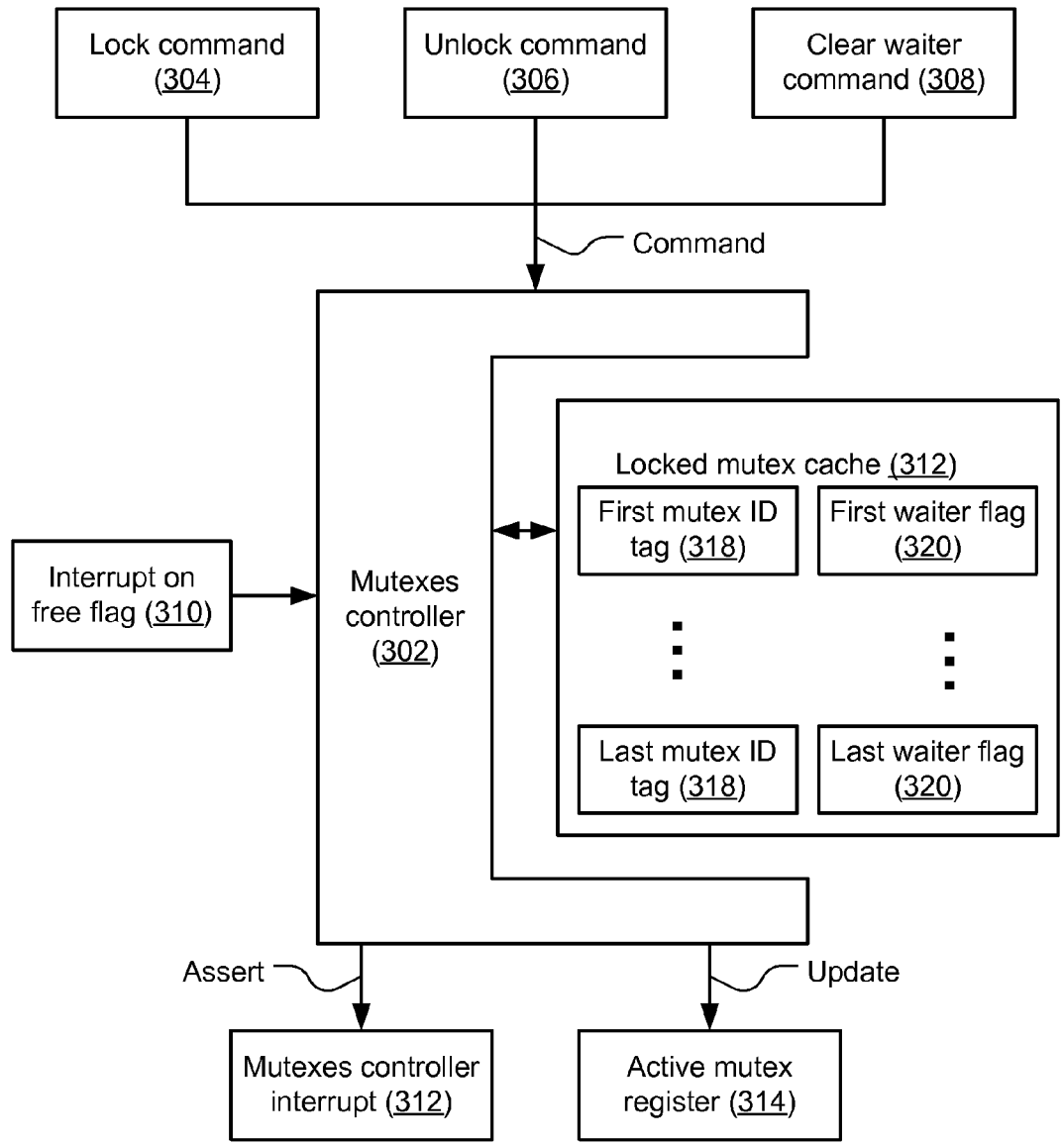
FIG. 5 is a block diagram showing the major components of a shared hardware mutex (shared HWM) in accord with the present invention.

FIG. 5 is a block diagram showing the major components of a shared HWM 300 in accord with the present invention. A mutexes controller 302 here handles the sharing of a pool of mutexes for the various available shared hardware resources. For this the mutexes controller 302 monitors a lock command register 304, an unlock command register 306, and a clear waiter command register 308 for indications from the software tasks. The mutexes controller 302 also can read an interrupt on free flag 310, and it can assert a mutexes controller interrupt 312 and load an active mutex register 314.

The lock command register 304 is written with a mutex ID value by a software task seeking to create a locked mutex, and the unlock command register 306 is written to by a software task to provided for unlocking a locked mutex.

The heart of the shared HWM 300 is a locked mutex cache 316, which looks very similar to a memory cache. The locked mutex cache 316 contains a list of mutex ID tags 318 which identify the cached locked mutexes. However, instead of lines of cache memory corresponding to the mutex ID tags 318, the locked mutex cache 316 also holds a list of waiter flags 320, one for each mutex ID tag 318. These waiter flags 320 are used to flag mutexes that have multiple lock requests outstanding.

The clear waiter command register 308 permits clearing a waiter flag 320 for a particular locked mutex. The interrupt on free flag 310 can be set to force an interrupt any time that an entry becomes free in the locked mutex cache 316.

The mutexes controller interrupt 312 and the active mutex register 314 are the two main outputs. The mutexes controller interrupt 312 signals the OS whenever software assistance is required from the OS kernel, and the active mutex register 314 identifies the cached mutex entry related to an assertion of the mutexes controller interrupt 312.

Figure 6A:
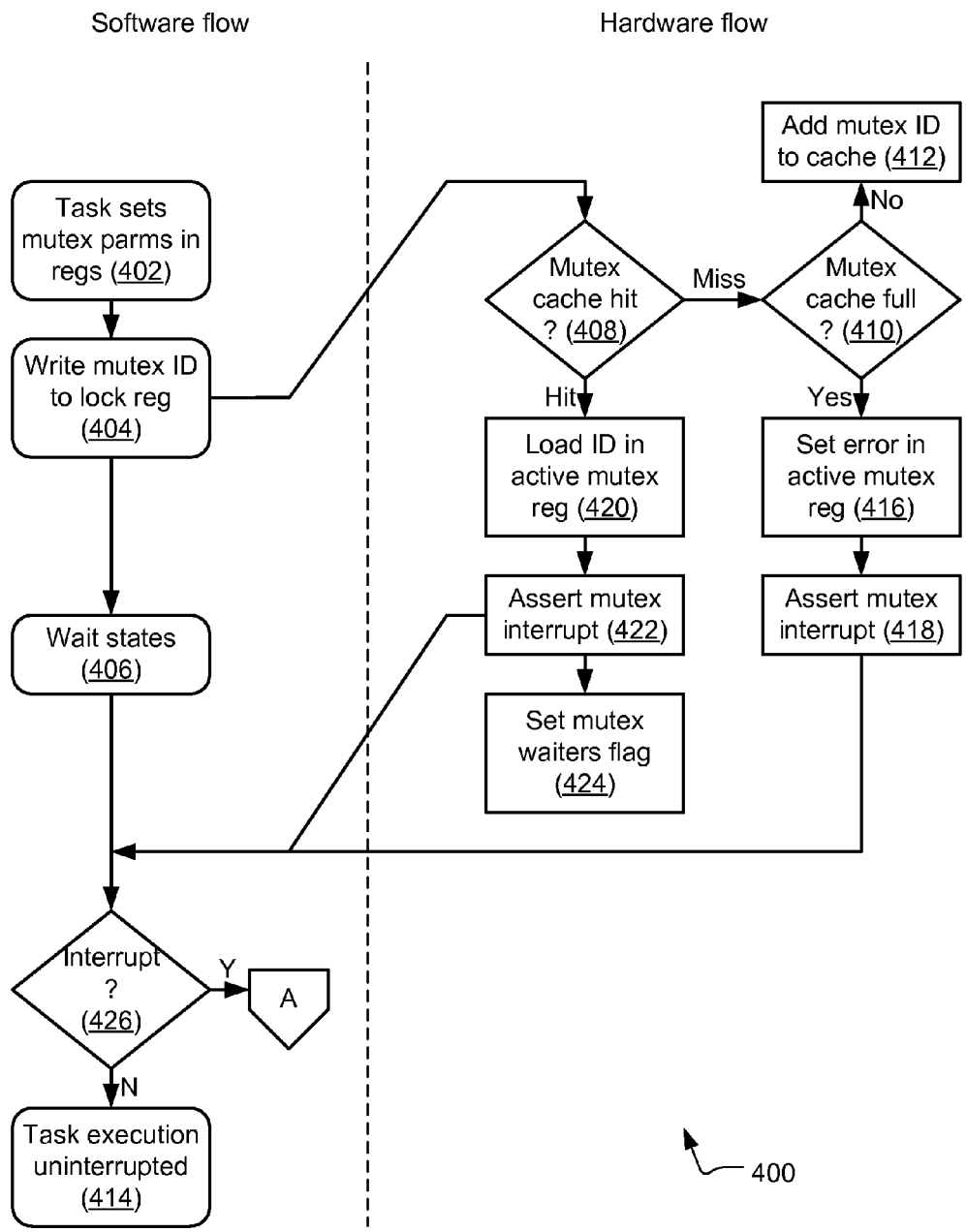
FIG. 6A-B (extending across two drawing sheets) is a flow chart showing a mutex lock process that is in accord with the present invention and suitable for use with the shared HWM.
Figure 6B:
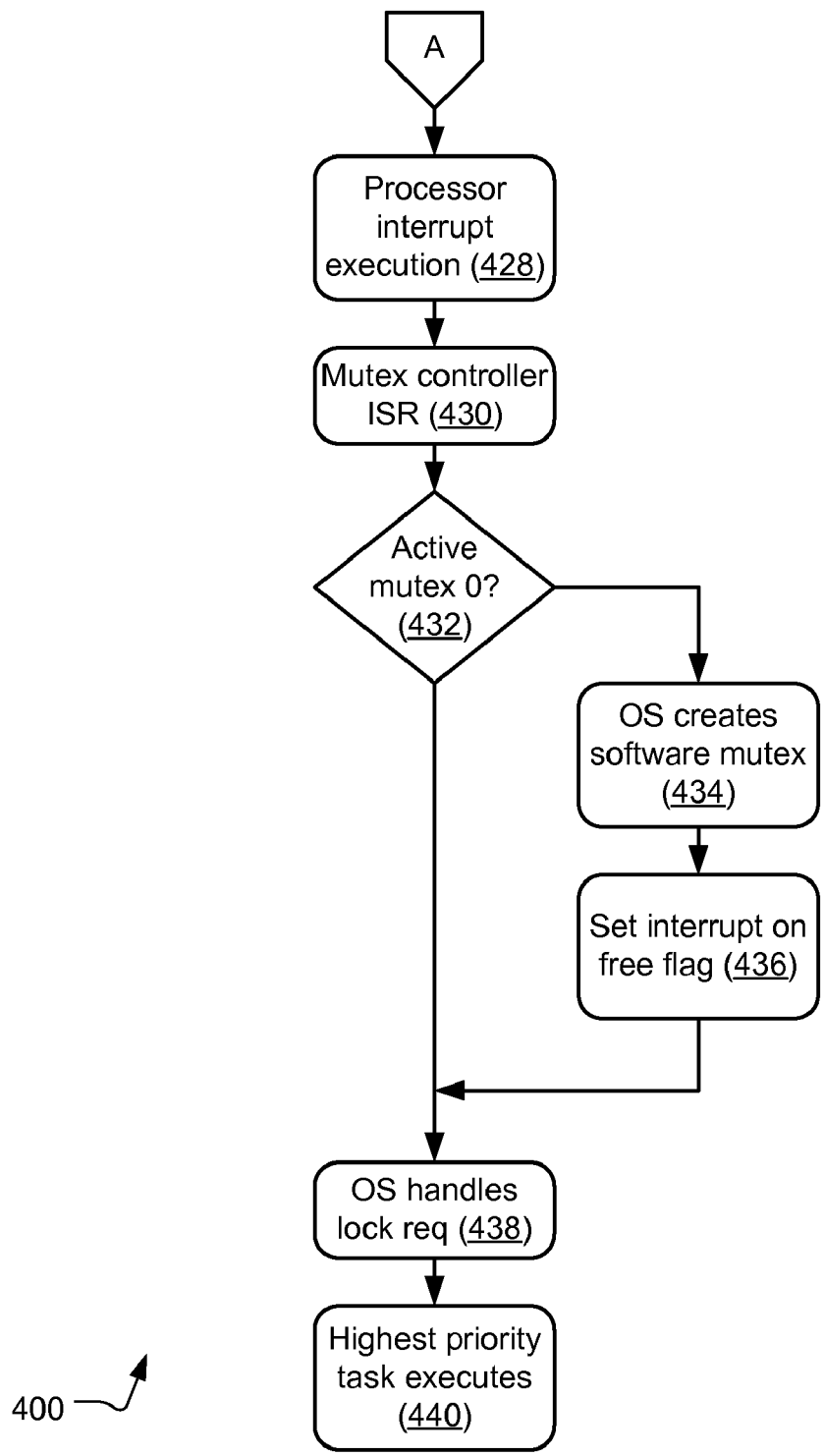

FIG. 6A-B is a flow chart showing a mutex lock process 400 that is in accord with the present invention and suitable for use with the shared HWM 300. Software task related steps are shown on the left and the shared hardware resource related steps are shown on the right side of this figure.

Similar to operation of the dedicated HWM 10, in an optional step 402 here as well an executing software task first sets optional parameters into processor registers or other locations that are well-known to the OS. Some examples of such parameters are wait timeout values, and block versus non-blocking flags. In a step 404 the software task next writes a unique mutex ID into the lock command register 304, and in an optional step 406 wait states can be inserted to prevent the software task from executing instructions while the mutexes controller 302 evaluates and acts on the lock request.

The mutex ID needs to be unique for every possible shared resource in the computerized system. For instance, it can be implemented as a system memory address, which would allow mutexes corresponding to any data structure in the system to be uniquely protected with any level of access granularity, even down to individual bytes. Memory-mapped hardware controller registers can also be seamlessly protected. Alternately, in a computerized system where virtual memory is in use and physical system memory addresses are not available, a process identifier can be added to a logical address in order to create a unique mutex ID.

Separately, in a step 408 the mutexes controller 302 monitors the lock command register 304 to determine the state of the shared HWM 300 (i.e., whether a mutex with the same ID has already been locked). If not, in a step 410 the mutexes controller 302 determines if there is space in the locked mutex cache 316.

If there is space, in a step 412 the mutex ID (from the lock command register 304) is stored in an empty slot in the locked mutex cache 316 as a new mutex ID tag 318. Execution of the current software task then simply continues with no interruption, at the instruction following the mutex lock process 400 (and any optional wait states) (i.e., at a step 414).

Alternately, however, if the locked mutex cache 316, is already filled with mutex ID tags 318 for locked mutexes, in a step 416 the mutexes controller 302 sets the active mutex register 314 to indicate an error condition and in a step 418 it asserts the mutexes controller interrupt 312.

Otherwise, if the mutexes controller 302 has determined back in step 408 that it did find a mutex ID tag 318 corresponding with the mutex ID in the lock command register 304, in a step 420 the mutexes controller 302 loads the mutex ID into the active mutex register 314, in a step 422 it asserts the mutexes controller interrupt 312, and in a step 424 it sets a waiters flag 320 for that mutex ID tag 318 in the locked mutex cache 316.

A step 426 here depicts where the software task becomes "aware" that it has been interrupted. Of course, if the mutexes controller 302 has not asserted the mutexes controller interrupt 312, the software task simply "sees" step 414 next.

If the mutexes controller interrupt 312 was asserted (in either step 418 or step 422), in a step 428 this causes execution of the software task to divert to the interrupt exception handler of its processor (the processor running that software task, if multiple processors are present). The interrupt exception handler then saves the state of the processor, including the parameters left in registers by the calling software task (back in step 402). In a step 430 control then passes to an interrupt service routine (ISR) in the mutexes controller 302, where the OS kernel is invoked using a semaphore or other OS primitive.

In a step 432 the OS kernel will then read the active mutex register 314 and determine if it indicates an error condition (set in step 416). If an error is indicated, the OS will know that the locked mutex cache 316 is full and in a step 434 it will create a software mutex for the mutex ID that was written to the lock command register 304. Since the locked mutex cache 316 now no longer contains mutex ID tags 318 for all of the active mutexes, in a step 436 the OS sets the interrupt on free flag 310 so that mutex cache coherency can be maintained when interleaved locks and unlocks are done on multiple mutexes.

Otherwise, if the active mutex register 314 did not indicate an error condition in step 432, mutex contention is indicated and in a step 438 the OS will handle the mutex lock request in software, referring to the parameters stored in step 402 about the calling tasks' state, to enable options such as lock timeouts, blocking vs. non-blocking, and priority inversion. Finally, after handling the lock request, in a step 440 the OS scheduler locates the highest priority task that is in a runnable state, and execution continues with that software task.

Figure 7A:
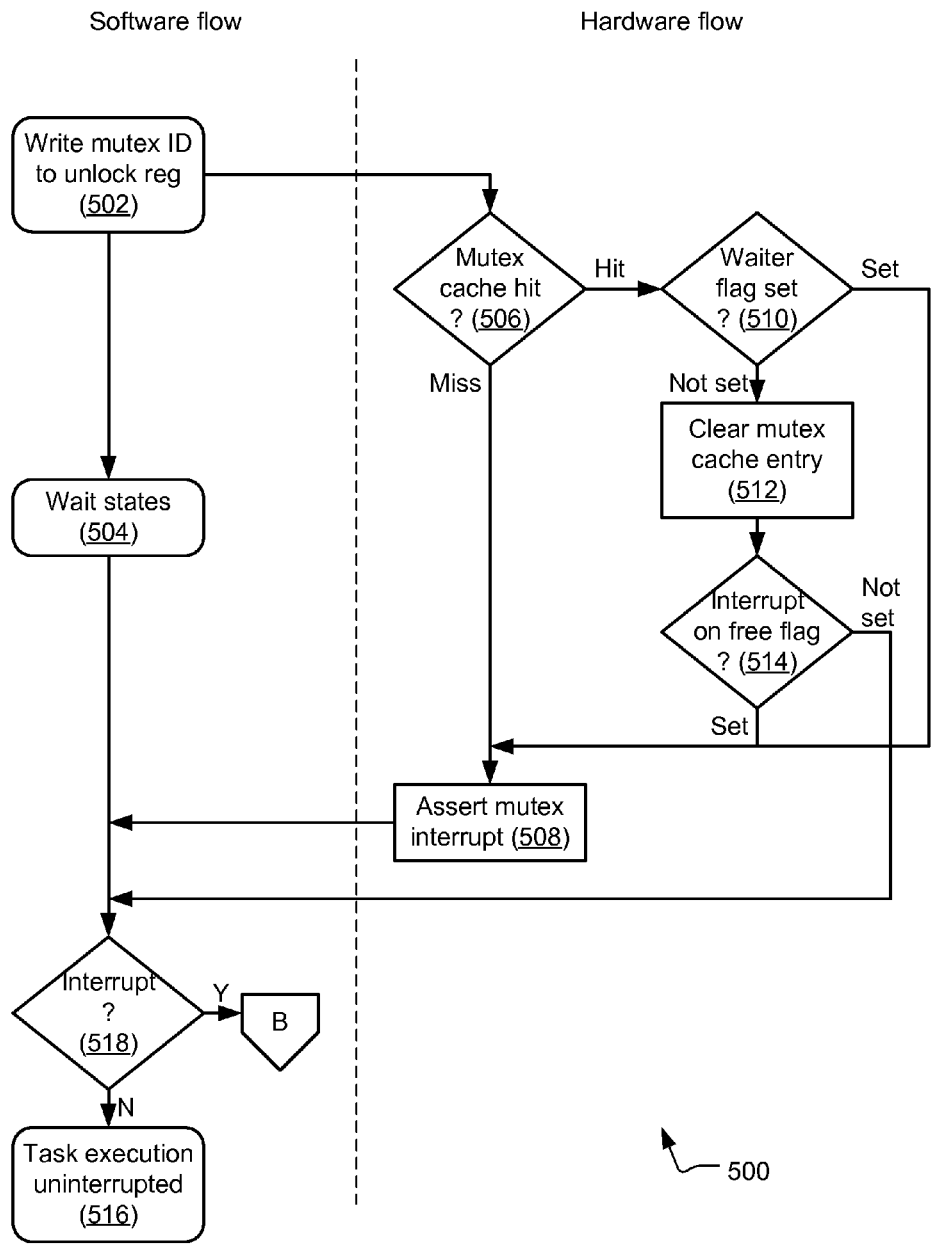
FIG. 7A-B (extending across two drawing sheets) is a flow chart showing a mutex unlock process that is in accord with the present invention and suitable for use with the shared HWM.
Figure 7B:
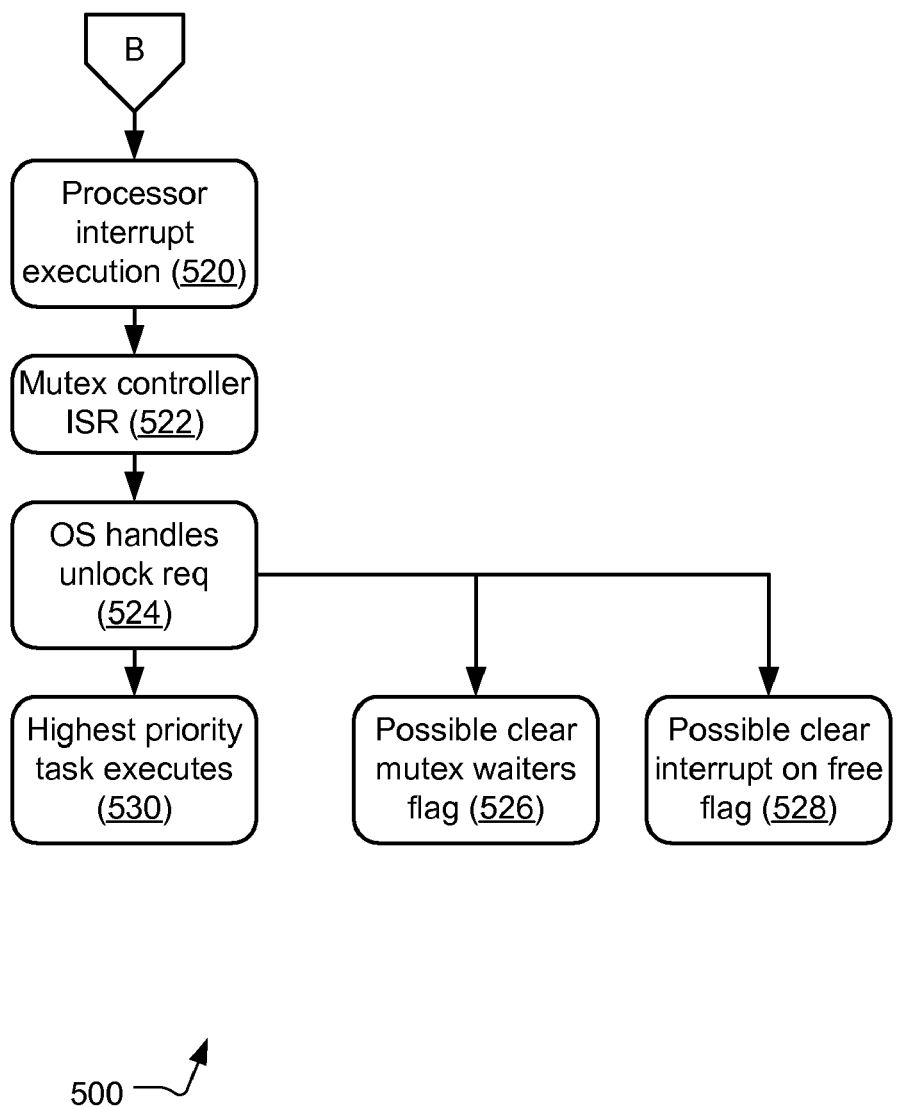

FIG. 7A-B is a flow chart showing a mutex unlock process 500 that is in accord with the present invention and suitable for use with the shared HWM 300. Again, software task related steps are shown on the left and the shared hardware resource related steps are shown on the right in the figure.

In a step 502 an executing software task writes a mutex ID into the in the unlock command register 306 and in an optional step 504 wait states can be inserted to prevent the software task from executing instructions while the mutexes controller 302 evaluates and acts on the unlock request.

Separately, in a step 506 the mutexes controller 302, which is monitoring the unlock command register 306, receives the mutex ID and searches for an entry for it in the locked mutex cache 316.

If the mutex ID is not found, in a step 508 the mutexes controller 302 simply asserts the mutexes controller interrupt 312 to force software handling of the unlock request. If a mutex ID tag 318 corresponding to the mutex ID is found, however, in a step 510, the mutexes controller 302 checks whether its associated waiters flag 320 is set.

If the waiters flag 320 is set, this indicates that there are other tasks waiting to lock the mutex for the particular resource, and in step 508 (again) the mutexes controller interrupt 312 is now asserted to allow the OS to handle the unlock request. If the waiters flag 320 is not set, however, in a step 512 the mutexes controller 302 clears the entry for the present mutex ID tag 318 from the locked mutex cache 316. Then, in a step 514 the mutexes controller 302 checks the state of the interrupt on free flag 310.

If the interrupt on free flag 310 is set, in step 508 (again) the mutexes controller 302 asserts the mutexes controller interrupt 312. If the interrupt on free flag 310 is not set, however, software execution simply continues, with no interruption, at the instruction following the mutex unlock process 500 (and any optional wait states) (i.e., at a step 516).

A step 518 here depicts where the software task becomes "aware" that it has been interrupted. Of course, here as well, if the mutexes controller 302 has not asserted the mutexes controller interrupt 312, the software task simply "sees" step 516 next.

If the mutexes controller interrupt 312 was asserted, however, in a step 520 this causes execution of the software task to divert to the interrupt exception handler of its processor (the processor running that software task, if multiple are present). Here the interrupt exception handler saves the state of the processor. In a step 522 control then passes to an interrupt service routine (ISR) associated with the mutexes controller 302, where the OS kernel is invoked using a semaphore or other OS primitive. In a step 524 the OS kernel then handles the rest of the request to unlock the shared HWM 300 in software. Optionally, if there are no other software tasks waiting to lock the resource associated with the present mutex ID tag 318, in a step 526 the OS kernel can also clear the waiters flag 320. Also optionally, if all software mutexes have been unlocked or have been transferred back into the locked mutex cache 316, in a step 528 the OS kernel can also clear the interrupt on free flag 310. Finally, after handling the unlock request in step 524, the OS scheduler locates the highest priority software task that is currently in a runnable state, and in a step 530 execution continues with that task.

Some General Considerations for the Hardware Mutexes (HWMs)

The handling of nested mutex locks can be handled in various manners, as a matter of design preference in embodiments of the inventive hardware mutex, such as the dedicated HWM 10 and the shared HWM 300. Some OSes support nested locking of mutexes, or "counting" mutexes, where the same software task can lock a mutex that it already has locked. The approach described above for the dedicated HWM 10 and the shared HWM 300 force the nested locks to be handled in software, since this otherwise would require the addition of a lock counter and an "owning task ID" for each mutex, as well as adding significant complexity to the mutex controller 12 or the mutexes controller 302. Adding this complexity is an option, but it is not the present inventor's preferred approach. Instead it is recommended that any mutexes requiring nesting continue to be supported in software rather than be adding hardware to support such "corner cases." The inventive hardware mutex is, however, still flexible enough to use in conditions where occasional nesting will occur. Usually the fast hardware-based lock/unlock approach will be followed then, with occasional invocations of the OS to handle the nested operations in software.

Accordingly, returning now to the needs discussed in the Background Art section, it can now be appreciated that the inventive hardware mutex provides a mechanism that eliminates the lock and unlock overhead under non-contending conditions in the kernel of an OS, and that significantly reduces the burden of handling contention when it does occur. Notably, the hardware mutex permits doing this without disabling processor interrupts to check and manage mutexes. And under the hardware mutex priority inversions can be handled naturally, since the OS always gains control when a lock is attempted on a mutex that is already in the locked state and the OS lock routine can handle the priority inversion in its usual manner.

While various embodiments have been described above, it should be understood that they have been presented by way of example only, and that the breadth and scope of the invention should not be limited by any of the above described exemplary embodiments, but should instead be defined only in accordance with the following claims and their equivalents.

INDUSTRIAL APPLICABILITY

The inventive hardware mutex, of which the dedicated HWM 10 and the shared HWM 300 are embodiments, is well suited for application in modern computer systems where multiple software tasks (or threads of execution in a same software process) must contend for access to shared single-access hardware resources. As has been described herein, the hardware mutex enables the locking and unlocking of critical sections in software process (i.e., the individual software tasks) with little or no overhead imposed on the operating system (OS) kernel.

For example, of particular importance today in the field of emerging portable computerized devices, the inventive hardware mutex reduces the power requirements of multi-threaded real-time operating system (RTOS) when many mutex operations are performed at low clock rates. This applies especially when most heavy processing is done with hardware accelerators and the RTOS processor acts mostly in a caretaker role. The overall system interrupt latency is then also improved by reducing or eliminating the frequency and duration of software critical sections which are usually implemented by disabling processor interrupts. This then may allow dropping the processor clock rate even further.

The hardware mutex also greatly simplifies the handling of hardware resources, by generally permitting mutex locks and waiters to be tracking within each hardware entity. For a lock operation, the OS only needs to be interrupted when a mutex is already locked, otherwise saving the locked state of the mutex silently with processor execution of the software task continuing with no interruption or critical section handling. Similarly, for an unlock operation, the OS only needs to be interrupted when a mutex has waiters, otherwise clearing the locked state of the mutex silently with execution proceeding with no interruption or critical section handling. The hardware mutex leaves mutex parameters in processor registers for the OS to collect if and only when lock fails and the OS gains control, thus reducing the interrupts that prior art approaches would require when a software task is blocked. Optionally, the inventive hardware mutex can be embodied to handle nested mutexes in such a way that commonly used un-nested operations are dealt with quickly by hardware, while barely used nested operations are supported by the OS.

Furthermore, while the inventive hardware mutex has been described herein with respect to applications having clear and wide immediate need, the hardware mutex can be extended by one of ordinary skill in the art once the teachings herein are appreciated. For instance, the hardware mutex can be generalized to support a generic counting semaphore. The mutex use case may produce more needless trips through the OS kernel than other semaphore use cases, but this approach may still have utility in some situations. Or the inventive hardware mutex can be hooked up to multiple processors, each with its own mutex lock/unlock/waiter registers and corresponding interrupt signals to arbitrate multi-processor mutexes. A register indicating the processor that triggered the mutex interrupt can be added to improve efficiency, although the same implementation can be done entirely in software on each processor if desired.

For the above, and other, reasons, it is expected that the hardware mutex of the present invention will have widespread industrial applicability and it is therefore expected that the commercial utility of the present invention will be extensive and long lasting.

What is claimed is:

1. A system comprising:
a mutexes controller comprising a locked mutex cache to store a list of records each including a mutex ID tag and a waiter flag;
a lock register and an unlock register that are each readable by said mutexes controller and loadable by software tasks with a mutex ID specifying, one of a plurality of hardware resources in a computer system, said computer system comprises an operating system; and
said mutexes controller operable to:
monitor whether said lock register has been loaded with a mutex ID and then:
determine whether said mutex ID corresponds with a mutex ID tag of a record in said locked mutex cache; and
if so, to set said waiter flag of said record; or
if not, to add a record to said locked mutex cache having said mutex ID tag that corresponds with said mutex ID; and
monitor whether said unlock register has been loaded with a mutex ID and then:
determine whether said mutex ID corresponds with a mutex ID tag of a record in said locked mutex cache; and
if so, determine whether said waiter flag of said record is not set and, if so, to clear said record from said locked mutex cache;
wherein an operating system scheduler is operable to locate highest priority software task in a runnable state after said add;
said computer system operable to then execute the highest priority software task; and
said system is operable to handle nested mutexes with hardware performing un-nested operations and said operating system performing nested operations.

2. The system of claim 1, further comprising a clear waiter register that is loadable by the software tasks with a mutex ID, and wherein said mutexes controller is further to monitor whether said clear waiter register has been loaded with a mutex ID and then determine whether said mutex ID corresponds with said mutex ID tag of said record in said locked mutex cache and reset said waiter flag of such said record.

3. The system of claim 1, wherein said mutexes controller is further to assert an interrupt to said operating system, and further comprising an active mutex register that is loadable by said mutexes controller and readable by said operating system.

4. The system of claim 3, wherein said mutexes controller is further operable to load said mutex ID into said active mutex register and assert said interrupt, thereby communicating to said operating system a request for conventional handling of said one of the hardware resources.

5. The system of claim 3, wherein said mutexes controller is further operable to determine if said locked mutex cache is full of said records and, if so, to load an error indication into said active mutex register and assert said interrupt.

6. The system of claim 3, further comprising an interrupt on free flag that is set-able by said operating system, and wherein said mutexes controller is further operable to check said interrupt on free flag and assert said interrupt.

7. A process for locking a mutex that controls access to a shared resource by software tasks running under an operating system, the process comprising:
monitoring a lock register for a mutex ID having been loaded therein by one of the software tasks;

determining whether said mutex ID corresponds with a mutex ID tag of a record in a locked mutex cache;
if so:
  setting a waiter flag of said record; and
  communicating to said operating system a request for conventional handling of the shared resource;
if not, adding a new record to said locked mutex cache with a mutex ID tag corresponding with said mutex ID, without interrupting the software tasks or the operating system;
after said communicating, an operating system scheduler locating highest priority software task in a runnable state;
executing said highest priority software task; and
handling nested mutexes with hardware performing un-nested operations and said operating system performing nested operations.

8. The process of claim 7, further comprising, prior to said monitoring, setting parameters for the mutex in registers accessible to the operating system for use by the operating system after said communicating.

9. The process of claim 7, wherein said communicating includes:
loading said mutex ID into an active mutex register that is readable by the operating system; and
asserting an interrupt.

10. The process of claim 7, wherein said adding includes determining if said locked mutex cache is full of said records and, if so:
loading an error indication into an active mutex register; and
asserting an interrupt.

11. The process of claim 7, wherein the operating system is a real-time type operating system.

12. The process of claim 7, further comprising:
determining if there is space available in said locked mutex cache.

13. The process of claim 12, further comprising:
if there is no space available in said locked mutex cache, setting an active mutex register to indicate an error.

14. A process for unlocking a mutex that controls access to a shared resource by software tasks running under an operating system, the process comprising:
monitoring an unlock register for a mutex ID having been loaded therein by one of the software tasks;
determining whether said mutex ID corresponds with a mutex ID tag of a record in a locked mutex cache;
if said mutex ID corresponds with a record:
  determining whether a waiter flag of said record is set;
    if said waiter flag is set, asserting an interrupt;
    if said waiter flag is not set, clearing said record from said locked mutex cache;
if said mutex ID does not correspond with a record, asserting an interrupt;
after an occurrence of either of said asserting said interrupt, an operating system scheduler locating highest priority software task in a runnable state;
executing said highest priority software task; and
handling nested mutexes with hardware performing un-nested operations and said operating system performing nested operations.

15. The process of claim 14, further comprising:
after said clearing, determining whether an interrupt on free flag is set and, if so, asserting an interrupt.

16. The process of claim 14, further comprising:
monitoring a clear waiter register for a mutex ID having been loaded therein by one of the software tasks; and
determining whether said mutex ID corresponds with a mutex ID tag of a record in said locked mutex cache and resetting said waiter flag of said record.

17. The process of claim 14, wherein the operating system is a real-time type operating system.

18. The process of claim 14, further comprising:
after said asserting the interrupt, invoking an operating system kernel using an operating system primitive.

19. The process of claim 18, further comprising:
said operating system kernel unlocking said mutex.

20. The process of claim 18, wherein said operating system primitive comprises a semaphore.

* * * * *